(12) United States Patent
Yang

(10) Patent No.: US 7,580,096 B2
(45) Date of Patent: Aug. 25, 2009

(54) LIQUID CRYSTAL DISPLAY DEVICE AND METHOD FOR FABRICATING THE SAME

(75) Inventor: Yong-Ho Yang, Seoul (KR)

(73) Assignee: Samsung Electronics Co., Ltd. (KR)

( * ) Notice: Subject to any disclaimer, the term of this patent is extended or adjusted under 35 U.S.C. 154(b) by 25 days.

(21) Appl. No.: 10/484,415

(22) PCT Filed: Jul. 31, 2002

(86) PCT No.: PCT/KR02/01446

§ 371 (c)(1),
(2), (4) Date: Jan. 20, 2004

(87) PCT Pub. No.: WO03/012538

PCT Pub. Date: Feb. 13, 2003

(65) Prior Publication Data

US 2004/0169779 A1    Sep. 2, 2004

(30) Foreign Application Priority Data

Aug. 1, 2001    (KR) .......................... 2001-0046646

(51) Int. Cl.
*G02F 1/1335* (2006.01)
(52) U.S. Cl. ..................................... 349/113; 349/114
(58) Field of Classification Search .......... 349/113–114
See application file for complete search history.

(56) References Cited

U.S. PATENT DOCUMENTS

| | | | |
|---|---|---|---|
| 4,431,272 A | 2/1984 | Yazawa et al. ............. 349/113 |
| 4,519,678 A * | 5/1985 | Komatsubara et al. ...... 349/160 |
| 5,408,345 A | 4/1995 | Mitsui et al. ................. 349/42 |
| 5,418,635 A | 5/1995 | Mitsui et al. ................ 349/113 |
| 6,281,952 B1 * | 8/2001 | Okamoto et al. .............. 349/12 |
| 6,380,995 B1 * | 4/2002 | Kim .......................... 349/113 |
| 6,747,718 B2 * | 6/2004 | Kanou et al. ................ 349/113 |
| 6,784,957 B2 * | 8/2004 | Kanou et al. ................ 349/113 |

FOREIGN PATENT DOCUMENTS

JP    10177106 A    6/1998

(Continued)

OTHER PUBLICATIONS

PCT International Search Report; International application No. PCT/KR02/01446; International filing date: Jul. 31, 2002; Date of Mailing: Nov. 13, 2002.

(Continued)

*Primary Examiner*—David Nelms
*Assistant Examiner*—W. Patty Chen
(74) *Attorney, Agent, or Firm*—Cantor Colburn LLP

(57) ABSTRACT

Disclosed are a liquid crystal display device and a method for fabricating the liquid crystal display device. A displayed image can or cannot be seen depending on an observation angle or observation point by using a reflection electrode (330), which has a reflection structure for changing a reflection factor depending on an observation angle, so that the image can be displayed through at least two different viewing angles in a LCD.

15 Claims, 10 Drawing Sheets

FOREIGN PATENT DOCUMENTS

| | | | |
|---|---|---|---|
| JP | 10325953 | A | 12/1998 |
| JP | 2000105370 | A | 4/2000 |
| JP | 2001217288 | A | 8/2000 |
| JP | 2001005015 | A | 1/2001 |
| JP | 2001075091 | A * | 3/2001 |
| JP | 2001211241 | A | 8/2001 |

OTHER PUBLICATIONS

PCT International Preliminary Examination Report; International application No. PCT/KR02/01446; International filing date: Jul. 31, 2002; Date of completion: Nov. 12, 2003.

Chinese Office Action for application No. 200610135599.5 dated Jan. 4, 2008, and English translation thereof.

* cited by examiner

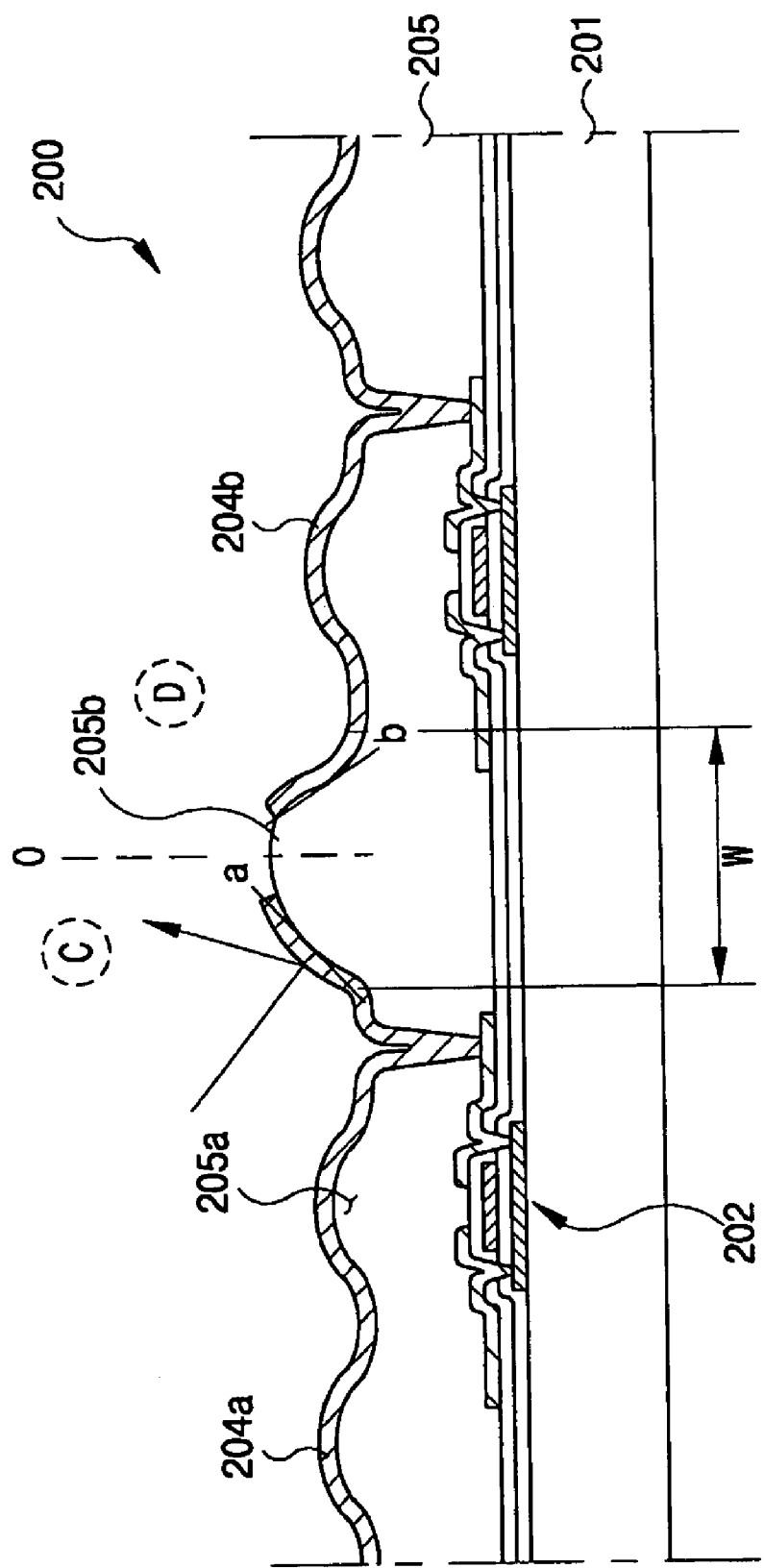

LIQUID CRYSTAL DISPLAY DEVICE AND METHOD FOR FABRICATING THE SAME

TECHNICAL FIELD

The present invention relates to a liquid crystal display device and a method for fabricating the device, and more particularly to a liquid crystal display device, which can display images by using at least two viewing angles respectively, and a method for fabricating the device.

BACKGROUND ART

Recently, the technologies in the field of electric and electro industries have developed, and the technology of devices that can promptly process a lot of data has been rapidly developed.

An information processing device processes inputted-by-observer data and generates result data with very fast calculating speed.

However, in spite of the usefulness of this information processing device, observers can't read and understand the result data generated from the information processing device, with only the information processing device, because the result data computed and processed are processed and stored in the information processing device as a status of an electrical signal.

For this reason, a display device, which observers can read and understand the result data generated from the information processing device through, is necessary as a interface device.

A cathode ray tube (CRT) type display device and a liquid crystal display (LCD) device are representative as the above-mentioned display device.

The CRT type display device scans electrons to a screen on which fluorescent materials and color pixels are distributed, and displays designed images. The scanned electrons are discharged from an electron gun and electro-magnetically controlled in the CRT type display device.

The LCD (Liquid Crystal Display device) makes the light, the transmissivity of which is altered by liquid crystal, to pass a color filter and to displays designed images.

The LCD can display an equivalent quality of images compared with the CRT type display device, but the LCD is small-sized and lightweight since it display the images by a several-micrometer (µm) thickness of liquid crystal layer.

Since the LCD cannot radiate light by itself, the LCD needs another light source.

For this reason, the LCD is divided into a reflective type LCD, a transmissive type LCD and a transmissive and reflective type LCD.

The reflective type LCD displays images using an external light, such as sunshine, interior illumination and outdoor illumination, etc.

The transmissive type LCD displays images using light generated by consuming internally charged electric power.

In this case, the reflective type LCD has an advantage that the power dissipation is very low because the reflective type LCD needs not consume electric power for lightening, but has a disadvantage that it can't display images where light does not exist or is weak because the display of information is possible only where light exists.

The transmissive type LCD has an advantage that it can provide a good quality of display anywhere whatever external light exists, but has a disadvantage that the power dissipation is higher than that of the reflective type LCD, because it uses the light generated by the consumption of electric power.

The reflective and transmissive type LCD has the advantages of the reflective type LCD and the transmissive type LCD together. Namely, the reflective and transmissive type LCD displays images using light generated by the consumption of electric power in a dark place, and displays images using external light in a well-lighted place. So, the reflective and transmissive type LCD can minimize the power dissipation for display.

However, the reflective type and the reflective and transmissive type LCD specially have a disadvantage that they can't satisfy the various requirements from the observers, since the viewing angle of them is fixed when being manufactured.

DISCLOSURE OF THE INVENTION

Therefore, regarding these disadvantages of the related arts, it is a first object of the present invention to provide an LCD, which can selectively control the light reflection factors in order to display only to predetermined view angles.

It is a second object of the present invention to provide a method for fabricating an LCD, which can selectively control the light reflection factors in order to display only to predetermined view angles.

To achieve the first object of the present invention, there is provided is a liquid crystal display device comprising: a first substrate including (i) a plurality of thin film transistors arranged in a matrix shape; (ii) an organic insulating layer insulating said thin film transistors from each other, said organic insulating layer having a contact hole exposing an output of each of said thin film transistors and a projection that has at least one irregular reflection surface to selectively control light reflection; and (iii) a first electrode formed on said organic insulating layer, said first electrode having a portion that is connected with said output so as to receive a first electric power, and said first electrode having a rest portion that covers said projection to have various reflection factors depending on an observation angle and formed in a matrix shape; a second substrate including i) a color filter disposed opposite to said first electrode and ii) a second electrode covering said color filter; and a liquid crystal interposed between said first substrate and said second substrate.

To achieve the second object of the present invention, there is provided a method for fabricating an LCD, the method comprising the steps of: forming a first substrate by (i) forming a plurality of thin film transistors arranged in a matrix shape; (ii) forming an organic insulating layer insulating said thin film transistors from each other, said organic insulating layer having a contact hole exposing an output of each of said thin film transistors and a projection that has at least one irregular reflection surface to selectively control light reflection; and (iii) forming a first electrode formed on said organic insulating layer, said first electrode having a portion that is connected with said output so as to receive a first electric power, and said first electrode having a rest portion that covers said projection to have various reflection factors depending on an observation angle and formed in a matrix shape; forming a second substrate including i) a color filter disposed opposite to the first electrode and ii) a second electrode covering the color filter; and interposing a liquid crystal between the first substrate and the second substrate.

According to the present invention, an image is displayed at respectively different viewing angle of at least 2 observation angles, so observers can see at respectively different viewing angle as they want.

BRIEF DESCRIPTION OF DRAWINGS

The above and other objects and advantages of the present invention will become readily apparent by reference to the following detailed description when considered in conjunction with the accompanying drawings wherein:

FIG. 5 is a sectional view of a TFT substrate according to the one embodiment of the present invention;

BEST MODE FOR CARRYING OUT THE INVENTION

Hereinafter, an LCD and a method for fabricating the LCD according to one embodiment of the present invention will be explained in detail, referring to accompanying drawings.

Figure 1:
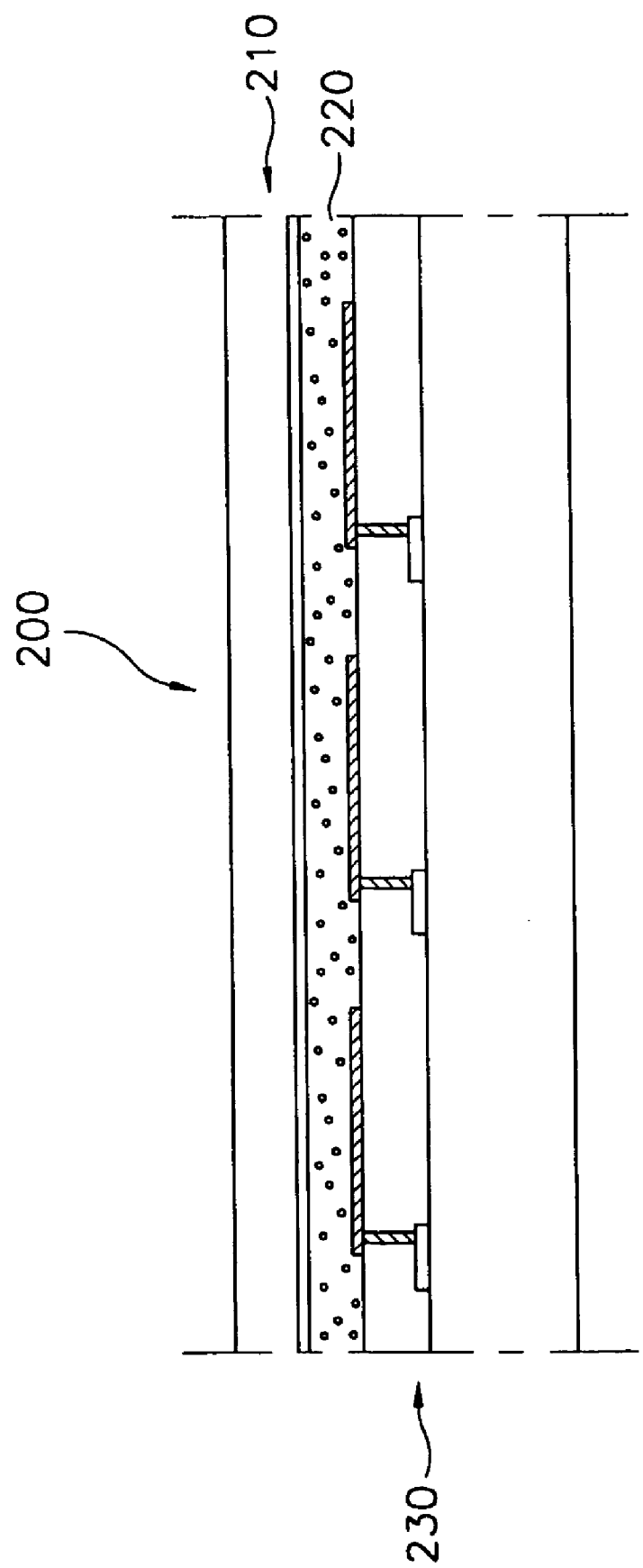
FIG. 1 is a schematic view of an LCD according to one embodiment of the present invention.

FIG. 1 is a schematic view of an LCD according to a first embodiment of the present invention.

The LCD indicated by a reference numeral 200 in FIG. 1 is a reflective type LCD, which displays images using external light and can reduce power consumption.

Referring to FIG. 1, the reflective type LCD 200 comprises a color filter substrate 210, a liquid crystal and thin film transistor (TFT) substrate 230.

The TFT substrate 230 and the color filter substrate 210 are coupled to be opposite to each other, and the liquid crystal 220 is interposed between the TFT substrate 230 and the color filter substrate 210.

Figure 2:
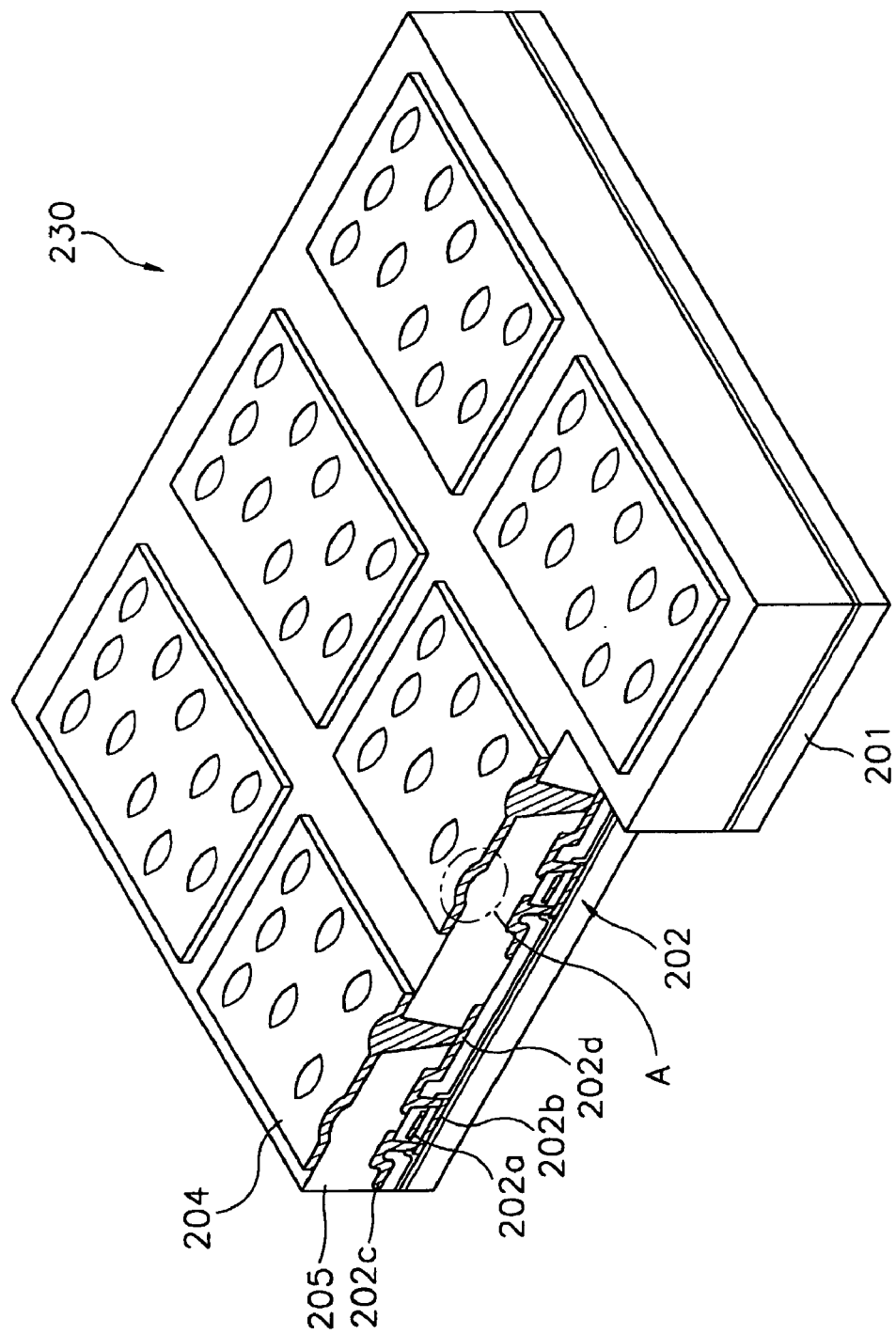
FIG. 2 is a partially sectional perspective view illustrating the TFT substrate in FIG. 1.

FIG. 2 is a partially sectional perspective view illustrating the TFT substrate in FIG. 1.

Referring to FIG. 2, the TFT substrate 230 comprises thin film transistors 202 formed on a transparent substrate 201, an organic insulating layer 205 and a first electrode 204.

The thin film transistors 202 are formed on a surface of the transparent substrate 201 in a matrix shape corresponding to a designed resolution.

The thin film transistors 202 supply predetermined electric power to the liquid crystal 220.

The thin film transistors are arranged in a matrix shape and each of them includes a gate electrode 202a, a channel layer 202b insulated from the gate electrode 202a, a source electrode 202c connected to one portion of the channel layer 202b, and a drain electrode 202d connected to the other portion of the channel layer 202b.

When an electric voltage is applied to the gate electrode 202a higher than a threshold voltage and an electric voltage is applied to the source electrode 202c, the electric voltage applied to the source electrode 202c is outputted to the drain electrode 202d via the channel layer 202b. The organic insulating layer 205 is thickly formed on a surface of the thin film transistors 202 after the thin film transistors 202 are formed on the transparent substrate 201.

The organic insulating layer 205 insulates the remaining portions except the drain electrode 202d of the thin film transistor 202 against a first electrode 204, and change viewing angles depending on an observation angle.

In the first embodiment, a contact hole is formed through the organic insulating layer 205 to expose the drain electrode 202d to the outside.

Figure 3A:
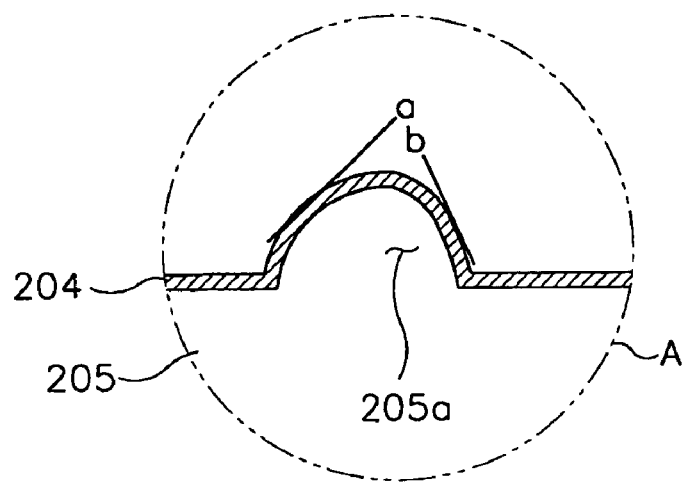
FIG. 3A is a partially enlarged view of 'A' in FIG. 2.

FIG. 3A is a partially enlarged view of 'A' in FIG. 2.

Referring to FIG. 3A, at least one projection 205a for varying a viewing angle is formed on the organic insulating layer 205 in order to change the viewing angles depending on an observation angle.

Each of the projections 205a has the same shape with each other and is projected from the organic insulating layer 205 in a half cylinder shape. In this case, the projection 205 has respectively different tangent gradient in at least two respectively different directions.

As shown in FIG. 3A, a tangent gradient of one portion of the projection is defined as a first gradient (refer to 'a') and a tangent gradient of the other portion of the projection is defined as a second gradient (refer to 'b').

A first electrode 204 is formed on the organic insulating layer 205 having the projections 205a thereon.

According to the first preferred embodiment, the first electrode 204 is formed by patterning a metal thin film, and each of the first electrodes 204 is formed corresponding to each of the thin film transistors 202.

The first electrode 204 has a profile in the same shape with that of the projection 205a for varying the viewing angle.

Figure 3B:
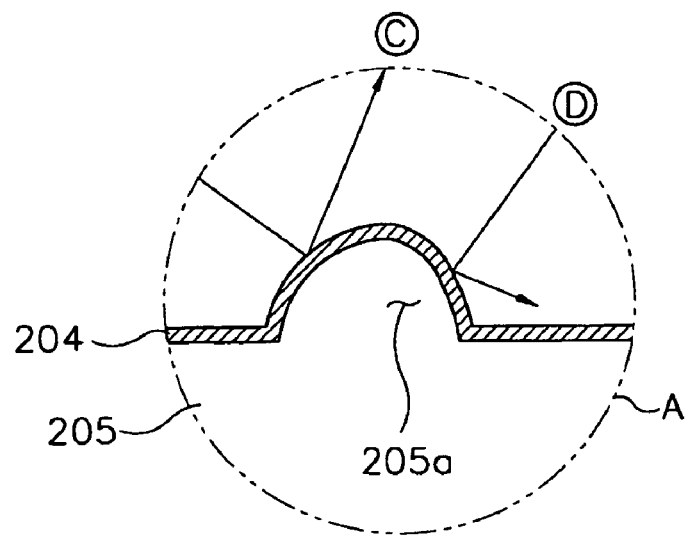
FIG. 3B is a sectional view illustrating a passing way of the light reflecting at the projection in the first electrode according to the one embodiment of the present invention.

FIG. 3B is a sectional view illustrating a passing way of the light reflecting at the projection in the first electrode according to the first embodiment of the present invention.

Referring to FIG. 3B, each portion of the first electrode 204 has respectively different tangent gradient in respectively different directions like the projection 205a, so that they have a different reflection factor and a different reflection direction depending on an observation angle, respectively.

In detail, when an observer's eye is located at an observation point 'C', the light is reflected on a portion, which is inclined by a gradient 'a', of the first electrode 204 toward the observer's eye located at point 'C'.

To the contrary, when the observer's eye is located at an observation point 'D', the light isn't reflected toward the observer's eye located at point 'D' on a portion, which is inclined by a gradient 'b', of the first electrode 204.

Namely, at the observation point 'C', the observer can see clean images reflected from the first electrode 204. But at the observation point 'D', the observer can't see clean images reflected from the first electrode 204.

This means that the clearness of image and each viewing angle varies according as an observation angle varies.

Figure 4A:
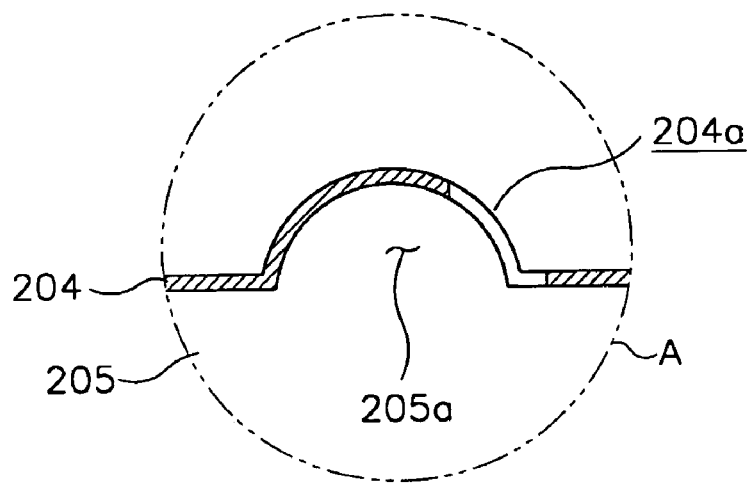
FIG. 4A is a sectional view illustrating another example of the first electrode according to the one embodiment of the present invention.
Figure 4B:
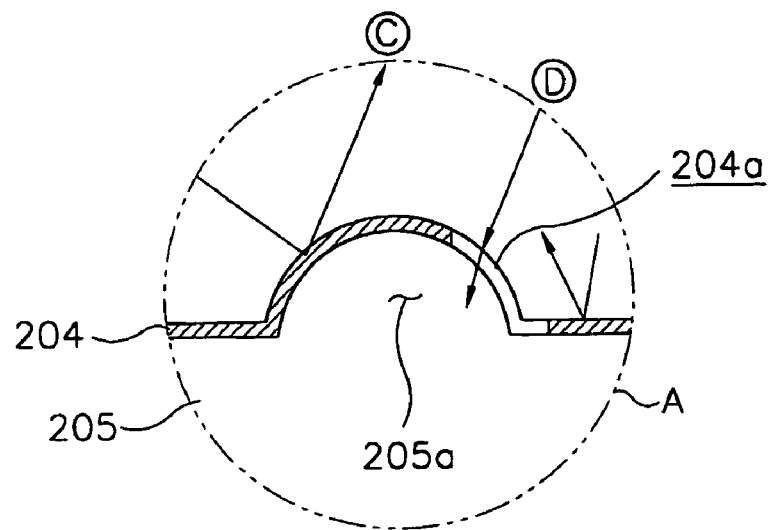
FIG. 4B is a sectional view illustrating that a viewing angle varies depending on an observation angle by a first electrode having an opening, according to the one embodiment of the present invention.

FIG. 4A is a sectional view illustrating another example of the first electrode according to the one embodiment of the present invention. FIG. 4B is a sectional view illustrating that a viewing angle changes depending on an observation angle by a first electrode having an opening, according to a second embodiment of the present invention.

Referring to FIG. 4A, an opening 204a is formed in the first electrode 204 in order to make a reflection factor depending on the observation angle more distinctive. The opening 204a is formed by removing a portion of the first electrode 204.

In this case, the opening 204a is formed one-sided with respect to the center of the projection 205a.

Referring to FIG. 4B, a portion where the projection 205a is exposed through the opening 204a in the first electrode 204 has a remarkably low reflection factor in comparison with the other portion where not exposed. Therefore, the viewing angles at the observation point 'C' and 'D' are different from each other.

FIG. 5 is a sectional view of a TFT substrate according to one embodiment of the present invention.

All parts of the TFT substrate 200 except a shape of the organic insulating layer 205 of the TFT substrate 200 in FIG. 5 are essentially equal to the TFT substrate in FIG. 2, so that the other parts except the organic insulating layer 205 will not be explained repeatedly.

Referring to FIG. 5, a contact hole and a viewing-angle varying section 205b are formed on the organic insulating layer 205.

The viewing-angle varying section 205b is disposed in space 'W' located between the two first electrodes 204a and 204b. The first electrodes 204a and 204b are separated each other in order to prevent the first electrodes 204a and 204b from being electrically short.

The viewing-angle varying section 205b has a half-cylindrical shape. In this case, the curved surface of the viewing-angle varying section 205b is disposed to be face a color filter substrate.

In this case, the viewing-angle varying section 205b is asymmetrical to the observation point (or observation angle) to have various viewing angles depending on an observation angle (or observation angle).

Referring to FIG. 5, both sides of the viewing-angle varying section 205b located at side portions of the viewing-angle varying section 205b with respect to the center O of the section 205b have different shape according to the embodiment. For example, the viewing-angle varying section 205b has a reflection surface with a tangent gradient of 'a' to reflect a light toward the observation point 'C', and has a reflection surface with a tangent gradient of 'b' to prevent a light from be reflected toward the observation point 'D'.

A portion of each of the two first electrode located on both sides of the viewing-angle varying section 205b is extended onto the surface of the viewing-angle varying section 205b, and overlaps with the surface of the viewing-angle varying section 205b. In this case, the two first electrode located on both sides of the viewing-angle varying section 205b are given reference numerals 204a and 204b.

The overlapped portions of the first electrode 204a and 204b have a different gradient because of the shape of the viewing-angle varying section 205b.

Therefore, the passing way of the light depends on the gradient of the viewing-angle varying section 205b at the overlapped portion in the first electrode 204a and 204b.

For example, when a incident light reflects at the overlapped portion, which is located on the surface of the viewing-angle varying section 205b, of the first electrode 204a, the incident light proceed toward the observation point 'C'. Accordingly, an observer can have a clean image at the observation point 'C'.

However, when a incident light reflects at the overlapped portion, which is located on the surface of the viewing-angle varying section 205b, of the first electrode 204b, the incident light doesn't proceed toward the observation point 'D'. Accordingly, an observer can't have a clean image at the observation point 'D'.

Figure 6:
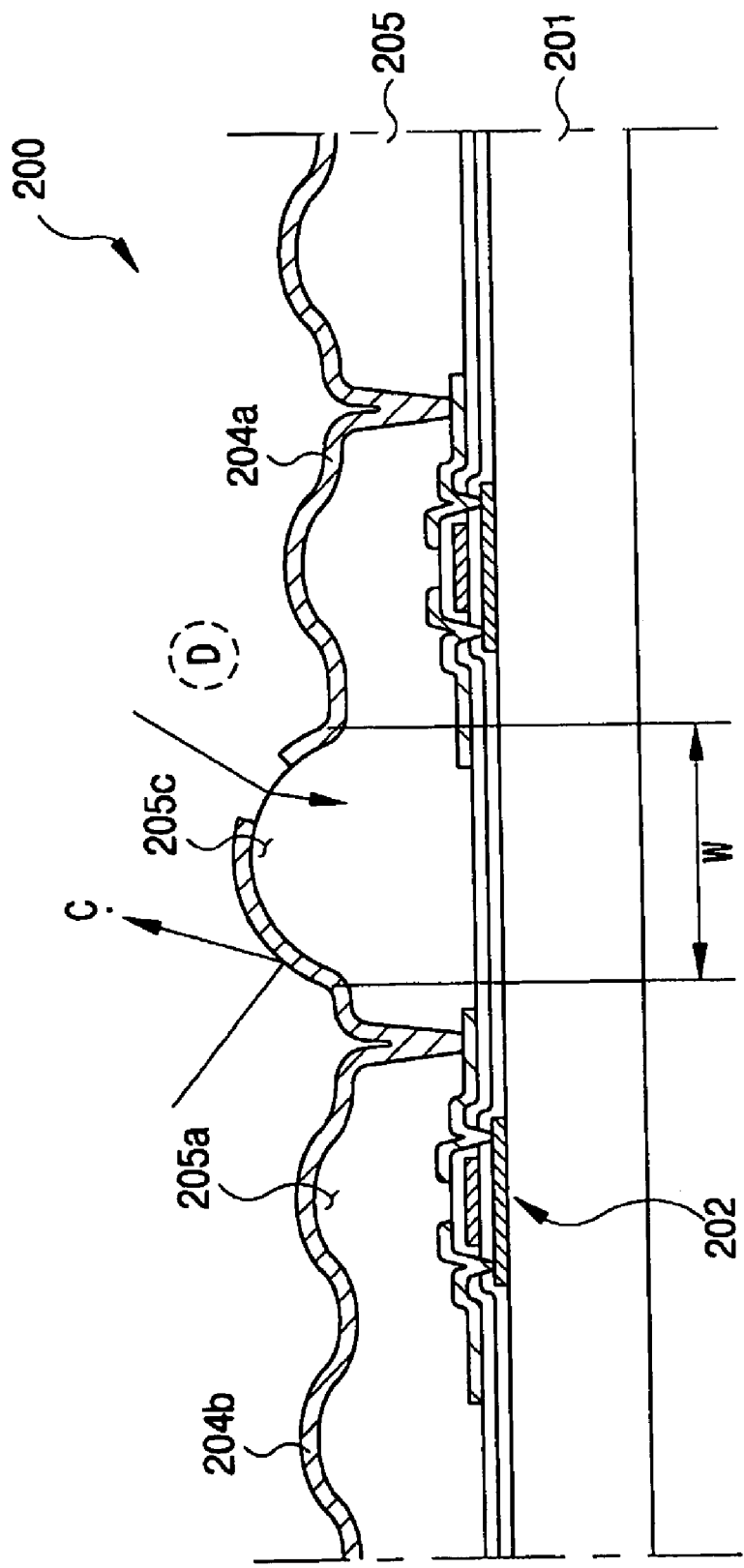
FIG. 6 is a sectional view illustrating a viewing-angle varying section according to another embodiment of the present invention.

FIG. 6 is a sectional view illustrating a viewing-angle varying section according to another embodiment of the present invention.

All parts except a shape of the organic insulating layer 205 of the TFT substrate in FIG. 6 are essentially equal to the TFT substrate in FIG. 2. Accordingly, the other parts except the organic insulating layer 205 will not be explained repeatedly.

Referring to FIG. 6, a contact hole and a viewing-angle varying section 205c are formed on the organic insulating layer 205.

The viewing-angle varying section 205c in FIG. 6 has a half-cylindrical shape and the half-cylinder is symmetric while the viewing-angle varying section 205b is not symmetric in FIG. 5. In this case, a curved surface of the viewing-angle varying section 205c faces a color filter substrate.

A portion of each of the first electrodes 204a and 204b is extended to the surface of the viewing-angle varying section 205c, and overlaps with the curved surface of the viewing-angle varying section 205c.

In this case, each overlapped portions of both the first electrodes 204a and 204b are formed asymmetrically on the curved surface of the symmetric viewing-angle varying section 205c.

Referring to FIG. 6, the overlapped portion of the first electrode 204a is longer than the overlapped portion of the other first electrode 204b.

When the overlapped portion of the first electrode 204a is longer or short than the overlapped portion of the other first electrode 204b, the directions and the reflection factors of the light reflected on the first electrode 204a and 204b are different from each other.

Particularly, the reflection light reflected at the overlapped portion in the first electrode 204b proceed toward eyes of an observer located at the observation point 'C'.

However, the reflection light reflected at the overlapped portion in the first electrode 204a doesn't proceed toward eyes of an observer located at the observation point 'D', or the amount of the light proceeding toward 'D' is very small.

Namely, even when the overlapped portions of both the first electrodes 204a and 204b are formed asymmetrically on the curved surface of the viewing-angle varying section 205c having a symmetric shape, an observer can or not recognize an image depending on an observation point, because the brightness and the visibility of the image are different from one anther depending on an observation point.

This LCD of the present invention can be applied on various purposes, such as protecting private information displayed on a screen, etc., since an observer can or not recognize the image depending on an observation point.

Figure 7:
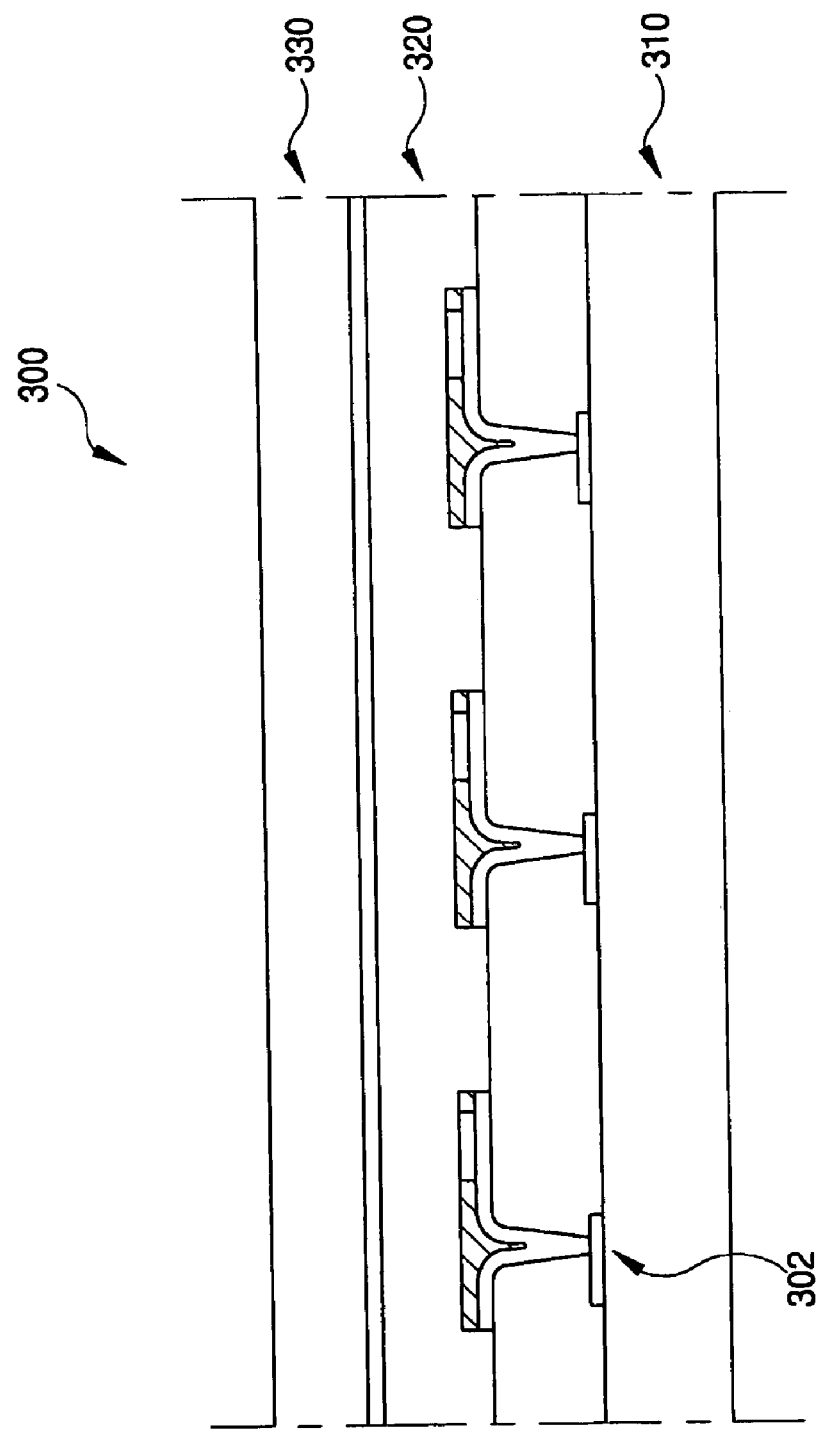
FIG. 7 is a schematic view of a reflective and transmissive type LCD according to a second embodiment of the present invention.

FIG. 7 is a schematic view of a transmissive and reflective type LCD according to another embodiment of the present invention.

Referring to FIG. 7, the transmissive and reflective type LCD 300 comprises a color filter substrate 330, a liquid crystal 320 and a TFT substrate 310.

The color filter substrate 330 and the TFT substrate 310 are respectively manufactured and then are combined with each other, and the liquid crystal 320 is interposed between the combined substrates 310 and 330.

Figure 8:
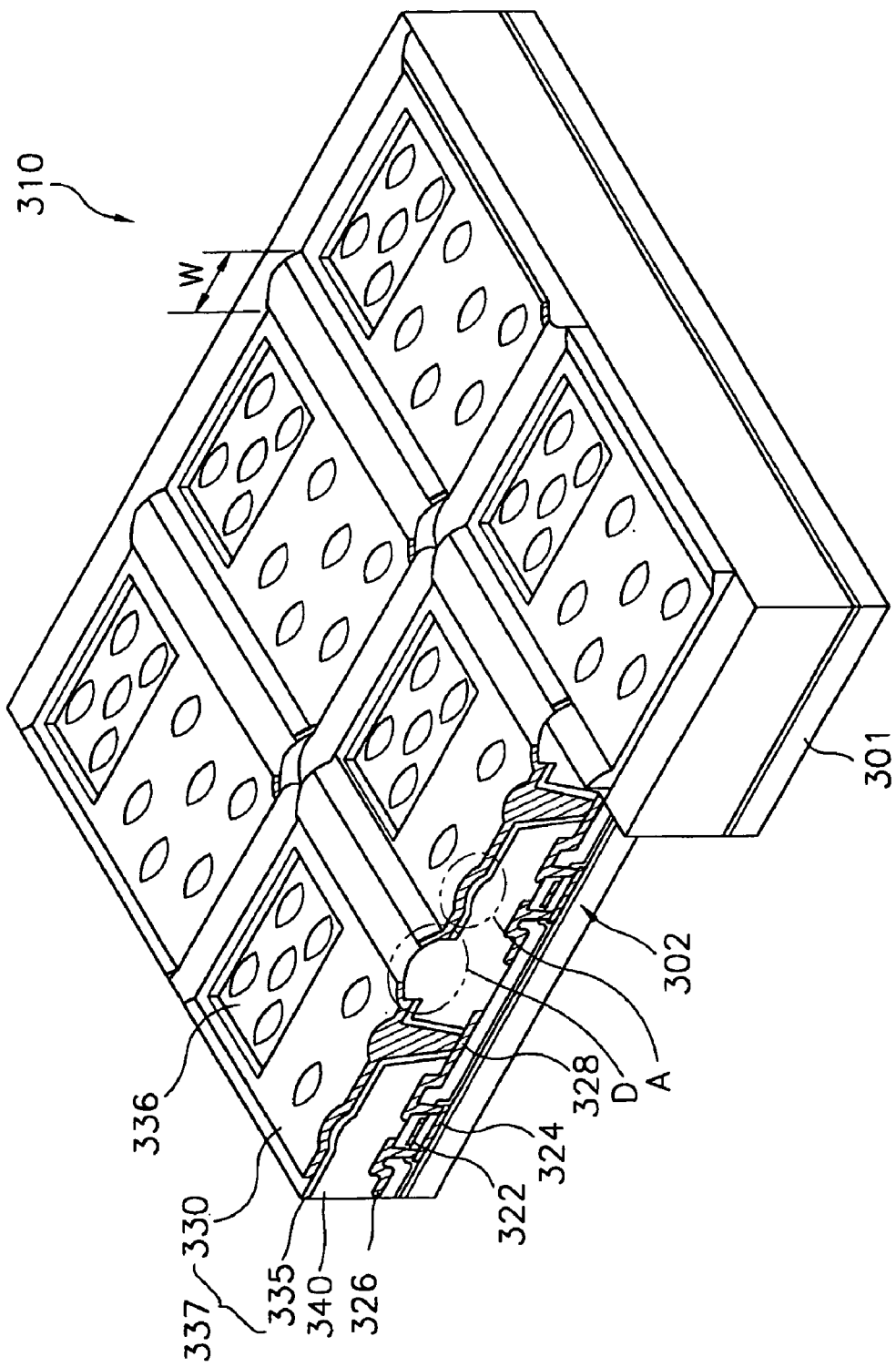
FIG. 8 is a partially sectional perspective view illustrating a portion of the TFT substrate in the transmissive and reflective type LCD in FIG. 7.

FIG. 8 is a partially sectional perspective view illustrating a portion of the TFT substrate in the transmissive and reflective type LCD in FIG. 7.

Referring to FIG. 8, the TFT substrate 310 includes a thin film transistor 320 formed on a transparent substrate 301, an organic insulating layer 340 and a first electrode 337.

The thin film transistors 302 are formed on a surface of the transparent substrate 301 in a matrix shape corresponding to a designed resolution.

The thin film transistors 302 are arranged in a matrix shape and each of them includes a gate electrode 322, a channel layer 324 insulated from the gate electrode 322, a source electrode 326 connected to one portion of the channel layer 324, and a drain electrode 328 connected to the other portion of the channel layer 324.

When an electric voltage is applied to the gate electrode 322 higher than a threshold voltage and an electric voltage is applied to the source electrode 326, the electric voltage applied to the source electrode 322 is outputted to the drain electrode 328 via the channel layer 324.

The organic insulating layer 340 is thickly formed on a surface of the thin film transistors 302 after the thin film transistors 302 are formed on the transparent substrate 301.

The organic insulating layer 340 insulates the all portions of the thin film transistor 320 except the drain electrode 328 of the thin film transistor 320 from a first electrode 337, and makes a viewing angle to vary depending on an observation angle.

A contact hole is formed through the organic insulating layer 340 to expose the drain electrode 328 to the outside, and a projection 342 is formed on the surface of the organic insulating layer 340.

Figure 9A:
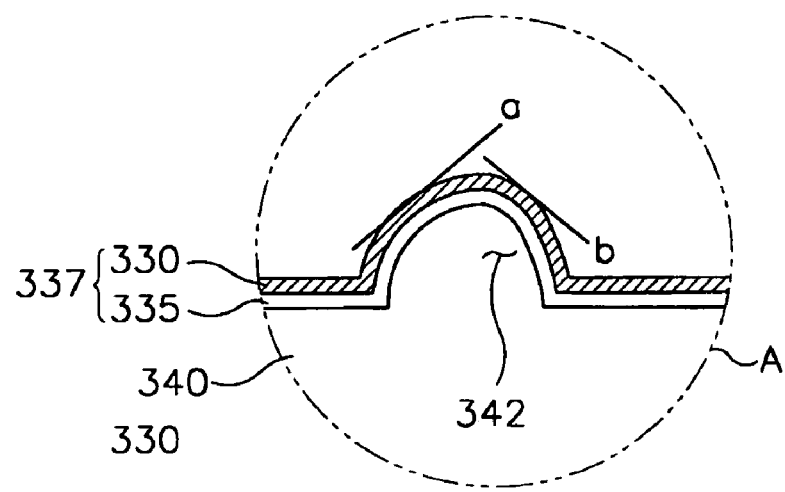
FIG. 9A is a sectional view of a projection for varying a viewing angle according to another embodiment of the present invention.

FIG. 9A is a sectional view of a projection 342 for varying a viewing angle according to another embodiment of the present invention.

The projection 342 is formed on the organic insulation layer 340 in order to make the viewing angle to vary depending on at least 2 observation angles.

Each of the projections 342 has at least 2 different surfaces with regard to at least 2 different directions, and each surfaces in a projection forms a different shape. For example, the projection 342 is projected in a shape of hemisphere and has different tangent gradients with respect to the center of the projection 342.

Referring to FIG. 9A, a tangent gradient of one portion of the projection 342 is defined as a first gradient (reference letter 'a'), and a tangent gradient of the other portion of the projection 342 is defined as a second gradient (reference letter 'b').

Figure 9B:
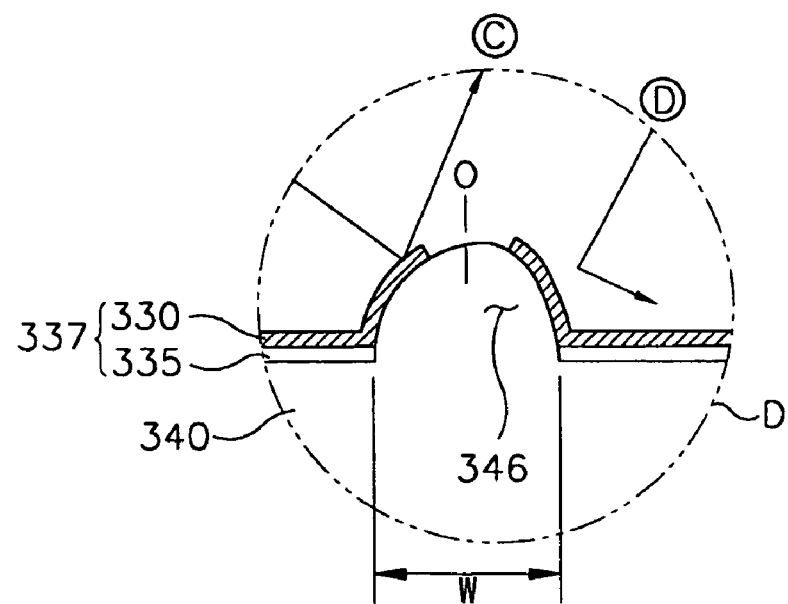
FIG. 9B is a sectional view of a viewing-angle varying section according to one embodiment of the present invention.

FIG. 9B is a sectional view of a viewing-angle varying section 346 according to another embodiment of the present invention.

Referring to FIG. 9B, not only the projections 342 but also a viewing-angle varying section 346 can be further formed on the organic insulating layer 340. The viewing-angle varying section 346 is formed at a space 'W' located between the first electrodes 337 on the organic insulating layer 340.

The viewing-angle varying section 346 has a half-cylindrical shape and is disposed horizontally on the organic insulating layer 340. In this case, a curved section of the viewing-angle varying section 346 faces a color filter substrate.

Also, the viewing-angle varying section 346 has an asymmetrical shape with respect to a center O thereof in order to make the viewing angle to vary depending on an observation angle.

Referring to FIG. 9B, both sides of the viewing-angle varying section 346 have different shape with respect to the center O of the viewing-angle varying section 346.

Tangent gradient on a corresponding point of both sides are different from each other with respect to the center O thereof.

The first electrode 337 is formed on the surface of the projection 342 and on one portion of the viewing-angle varying section 346. The first electrode 337 includes a transparent electrode 335 and a reflection electrode 330.

The transparent electrode 335 is formed on the organic insulating layer 340 in a matrix shape to cover the projection 342.

According to the one preferred embodiment, the transparent electrode 335 is formed by patterning a transparent and conductive film. In this case, the transparent electrodes 335 is formed over each of the thin film transistors 320, and the transparent electrodes 335 are arranged on the organic insulating layer 340 in a matrix shape like the thin film transistors 320.

This transparent electrode 335 transmits a light provided through a rear surface and also changes a light transmissivity of a liquid crystal by applying electric field to the liquid crystal.

The reflection electrode 330 is formed by patterning a metal film having the transparent electrode 335. In this case, each of the reflection electrodes 330 and a transparent electrode 335 are formed to correspond to each other.

The reflection electrode 330 reflects a light provided from the upper part of the transparent substrate 301, and allows the reflected light to pass through the liquid crystal. In this case, an opened window 336 is formed in the reflection electrode 330 to make the light to pass through the transparent substrate 301.

At that time, the reflection electrode 330 is extended onto the viewing-angle varying section 346 and overlapped with a top surface of the asymmetric viewing-angle varying section 346, as shown in FIG. 9B. Each of the overlapped portions has equal length on the viewing-angle varying section 346.

Also, because the gradients of the viewing-angle varying section 346 are different, the reflection electrode 330 has different gradients corresponding to the gradients of the viewing-angle varying section 346.

When the reflection electrode 300 has the different gradients with respect to the viewing-angle varying section 346, a image can or cannot be displayed depending on an observation angle.

Figure 9C:
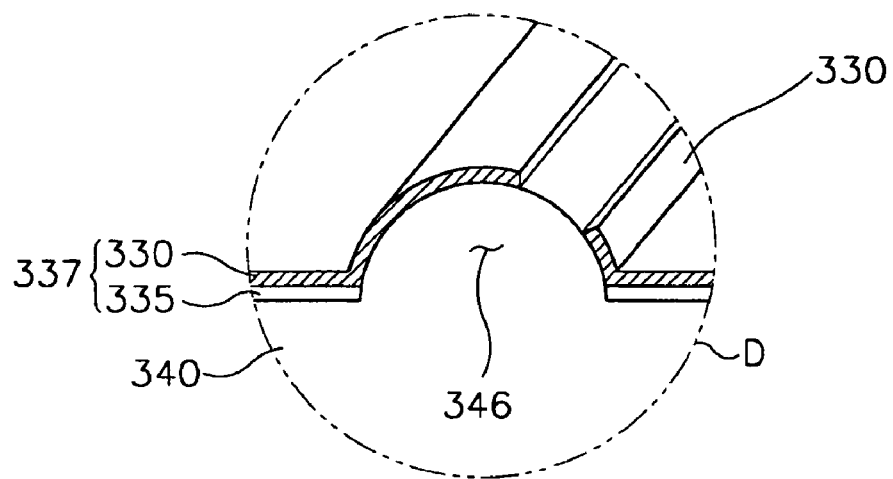
FIG. 9C is a sectional view of the viewing-angle varying section according to another embodiment of the present invention.

FIG. 9C is a sectional view of the viewing-angle varying section according to another embodiment of the present invention.

Referring to FIG. 9C, unlike the viewing-angle varying section 346 shown in FIG. 9B, the viewing-angle varying section 347 has a symmetrical half-cylindrical shape and is disposed horizontally. In this case, a curved surface of the viewing-angle varying section 347 faces the color filter substrate.

The first electrode 337 is formed on the surface of the projection 342 and on a portion of the viewing-angle varying section 347. The first electrode 337 includes a transparent electrode 335 and a reflection electrode 330.

The transparent electrode 335 will not be explained repeatedly since the transparent electrode 335 is essentially equal to the transparent electrode afore mentioned in the previous embodiment.

The reflection electrode 330 is formed by patterning a metal film entirely covering the transparent electrode 335. In this case, a transparent electrode 335 and a reflection electrode 330 is formed to make a pair.

The reflection electrode 330 reflects a light provided from the upper part of the transparent substrate 301, and makes the reflected light to pass through the liquid crystal. In this case, an opened window 336 is formed in the reflection electrode 330 to make the light pass through the transparent substrate 301.

As shown in FIG. 9C, the reflection electrodes 330 are formed asymmetrically on the symmetric viewing-angle varying section 347 of FIG. 9B.

Figure 9D:
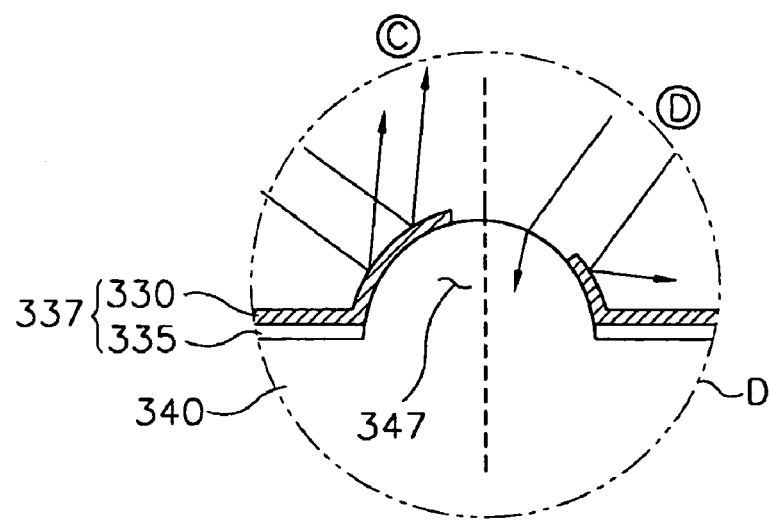
FIG. 9D is a sectional view for explaining the function of the viewing-angle varying section according to the one preferred embodiment.

FIG. 9D is a sectional view for explaining the function of the viewing-angle varying section according to another embodiment.

Referring to FIG. 9D, the reflection electrodes 330 located on both sides of the viewing-angle varying section 347 have a different length of an extended portion overlapped with the viewing-angle varying section 347. Accordingly, the reflection electrodes 330 have a different reflection factor, and an image can or cannot be displayed depending on an observation angle.

According to the present invention as aforementioned, the viewing angle of the LCD can be controlled within a predetermined range by using a reflection characteristic of an external light and a transmission characteristic of a transmissive light in an LCD.

Although preferred embodiments of the present invention have been described, it is understood that the present invention should not be limited to these preferred embodiments but various changes and modifications can be made by one skilled in the art within the spirit and scope of the present invention as hereinafter claimed.

The invention claimed is:

1. A liquid crystal display device comprising:
   a first substrate including:
   (i) a plurality of thin film transistors arranged in a matrix shape;
   (ii) an organic insulating layer insulating said thin film transistors from each other, said organic insulating layer having a contact hole exposing an output of each of said thin film transistors and a projection that has at least one irregular reflection surface to selectively control light reflection, wherein a slope of a first tangent of a curve in a first direction of said projection is higher than a slope of a second tangent of a curve in a second direction of said projection;
   (iii) a plurality of first electrodes formed in a matrix shape on said organic insulating layer, each of said first electrodes having a portion that is connected with said output so as to receive a first electric power, and a rest portion that covers said projection, each said rest portion having an opening formed through each of said first electrodes corresponding to a display area to have various reflection factors depending on an observation angle; and
   (iv) a viewing-angle varying section between the first electrodes, the viewing-angle varying section having a curved surface protruding from the organic insulating layer and having a symmetrical shape, and the rest portion of each of said plurality of first electrodes disposed at both sides of said viewing-angle varying section asymmetrically extends onto the curved surface of said viewing-angle varying section, to thereby change the reflection factor depending on an observation angle;
   a second substrate including i) a color filter disposed opposite to said first electrode and ii) a second electrode covering said color filter; and
   a liquid crystal interposed between said first substrate and said second substrate.

2. The liquid crystal display device of claim 1, wherein said viewing-angle varying section is formed in matrix configuration.

3. The liquid crystal display device of claim 2, wherein said curved surface of said viewing-angle varying section faces said second substrate.

4. A liquid crystal display device comprising:
   a first substrate including:
   (i) a plurality of thin film transistors arranged in a matrix shape;
   (ii) an organic insulating layer insulating said thin film transistors from each other, said organic insulating layer having a contact hole exposing an output of each of said thin film transistors and a projection that has at least one irregular reflection surface to selectively control light reflection;
   (iii) a plurality of first electrodes having a transparent electrode, said transparent electrode which has a portion thereof connected with said output so as to apply a first electric power and a rest portion thereof covering said projection, and a reflection electrode supplied with electric power from said transparent electrode, said reflection electrode which has a first portion thereof opened to transmit a first light and a second portion thereof covering said transparent electrode formed on said projection to change a reflection factor of a second light passing in a different direction from said first light depending on an observation angle, wherein the first portion includes a plurality of projections; and
   (iv) a viewing-angle varying section formed on the organic insulating layer, the viewing-angle varying section having a curved surface of a half-cylindrical shape, the curved surface located between two reflection electrodes and projected in a half-cylindrical shape;
   a second substrate including i) a color filter disposed opposite to said first electrode and ii) a second electrode covering said color filter; and
   a liquid crystal interposed between said first substrate and said second substrate,
   wherein said viewing-angle varying section has a symmetrical shape, and a portion of each of said two reflection electrodes disposed at both sides of said viewing-angle varying section asymmetrically extends onto the curved surface of said viewing-angle varying section, to thereby change the reflection factor depending on an observation angle.

5. The liquid crystal display device of claim 4, wherein an opening is formed at a portion of said reflection electrode on said projection to have the various reflection factor depending on an observation angle.

6. The liquid crystal display device of claim 4, wherein the curved surface of the viewing-angle varying section faces said second substrate.

7. The liquid crystal display device of claim 4, wherein said viewing-angle varying section has an asymmetrical half-cylindrical shape.

8. The liquid crystal display device of claim 7, wherein a portion of each of said two reflection electrodes disposed at both sides of said viewing-angle varying section extends onto the curved surface of said viewing-angle varying section, to thereby change the reflection factor depending on an observation angle.

9. A method for fabricating a liquid crystal display device, the method comprising the steps of:
forming a first substrate by (i) forming a plurality of thin film transistors arranged in a matrix shape; (ii) forming an organic insulating layer insulating said thin film transistors from each other, said organic insulating layer having a contact hole exposing an output of each of said thin film transistors and a projection that has at least one irregular reflection surface to selectively control light reflection, wherein a slope of a first tangent of a curve in a first direction of said projection is higher than a slope of a second tangent of a curve in a second direction of said projection; (iii) forming a plurality of first electrodes formed in a matrix shape on said organic insulating layer, each of said first electrodes having a portion that is connected with said output so as to receive a first electric power, and a rest portion that covers said projection, each said rest portion having an opening formed through each of said first electrodes corresponding to a display area to have various reflection factors depending on an observation angle; and (iv) forming a viewing-angle varying section between the first electrodes, the viewing-angle varying section having a curved surface of a half-cylindrical shape and protruding from the organic insulating layer;
forming a second substrate including i) a color filter disposed opposite to the first electrode and ii) a second electrode covering the color filter; and
interposing a liquid crystal between the first substrate and the second substrate,
wherein said viewing-angle varying section has a symmetrical shape, and the rest portion of each of said first electrodes disposed at both sides of said viewing-angle varying section asymmetrically extends onto the curved surface of said viewing-angle varying section, to thereby change the reflection factor depending on an observation angle.

10. A method for fabricating a liquid crystal display device, the method comprising the steps of:
forming a first substrate by (i) forming a plurality of thin film transistors arranged in a matrix shape; (ii) forming an organic insulating layer insulating said thin film transistors from each other, said organic insulating layer having a contact hole exposing an output of each of said thin film transistors and a projection that has at least one irregular reflection surface to selectively control light reflection; (iii) forming a plurality of first electrodes having a transparent electrode, said transparent electrode which has a portion thereof connected with said output so as to apply a first electric power and a rest portion thereof covering said projection, and a reflection electrode supplied with electric power from said transparent electrode, said reflection electrode which has a first portion thereof opened to transmit a first light and a second portion thereof covering said transparent electrode formed on said projection to change a reflection factor of a second light passing in a different direction from said first light depending on an observation angle, wherein the first portion includes a plurality of projections; and (iv) forming a viewing-angle varying section on the organic insulating layer, the viewing-angle varying section having a curved surface, the curved surface located between two reflection electrodes and projected in a half-cylindrical shape;
forming a second substrate including i) a color filter disposed opposite to said first electrode and ii) a second electrode covering said color filter; and
interposing a liquid crystal interposed between said first substrate and said second substrate,
wherein said viewing-angle varying section has a symmetrical shape, and a portion of each of said two reflection electrodes disposed at both sides of said viewing-angle varying section asymmetrically extends onto the curved surface of said viewing-angle varying section, to thereby change the reflection factor depending on an observation angle.

11. A liquid crystal display device comprising:
a first substrate including:
(i) a plurality of thin film transistors arranged in a matrix shape;
(ii) an organic insulating layer insulating said thin film transistors from each other, said organic insulating layer having a contact hole exposing an output of each of said thin film transistors and a projection that has at least one irregular reflection surface to selectively control light reflection;
(iii) a plurality of first electrodes formed in a matrix shape on said organic insulating layer, each of said first electrodes having a portion that is connected with said output so as to receive a first electric power, and a rest portion that covers said projection to have various reflection factors depending on an observation angle, wherein an opening is formed at a portion of each of said first electrodes on each of said projections to have the various reflection factor depending on an observation angle; and
(iv) a viewing-angle varying section between the first electrodes, the viewing-angle varying section having a curved surface of a half-cylindrical shape and protruding from the organic insulating layer;
a second substrate including i) a color filter disposed opposite to said first electrode and ii) a second electrode covering said color filter; and
a liquid crystal interposed between said first substrate and said second substrate,
wherein said viewing-angle varying section has a symmetrical shape, and the portions of said first electrode disposed at each side of said viewing-angle varying section asymmetrically extend onto the curved surface of said viewing-angle varying section, to thereby change the reflection factor depending on an observation angle.

12. The liquid crystal display device of claim 11, wherein said viewing-angle varying section is formed in matrix configuration.

13. The liquid crystal display device of claim 12, wherein said curved surface of said viewing-angle varying section faces said second substrate.

14. A method for fabricating a liquid crystal display device, the method comprising the steps of:
forming a first substrate by (i) forming a plurality of thin film transistors arranged in a matrix shape; (ii) forming an organic insulating layer insulating said thin film transistors from each other, said organic insulating layer having a contact hole exposing an output of each of said thin film transistors and a projection that has at least one irregular reflection surface to selectively control light reflection; (iii) forming a plurality of first electrodes in a matrix shape formed on said organic insulating layer, each of said first electrodes having a portion that is connected with said output so as to receive a first electric power, and a rest portion that covers said projection to have various reflection factors depending on an observation angle, wherein an opening is formed at a portion of each of said first electrodes on each of said projections to have the various reflection factor depending on an observation angle; and (iv) a viewing-angle varying section between the first electrodes, the viewing-angle varying section having a curved surface and protruding from the organic insulating layer, the viewing-angle varying section having a symmetrical shape and the rest portion disposed at both sides of the viewing-angle varying section asymmetrically extends onto the curved surface of the viewing-angle varying section;

forming a second substrate including i) a color filter disposed opposite to the first electrode and ii) a second electrode covering the color filter; and interposing a liquid crystal between the first substrate and the second substrate.

15. A liquid crystal display device comprising:

a first substrate including:

(i) a plurality of thin film transistors arranged in a matrix shape;

(ii) an organic insulating layer insulating said thin film transistors from each other, said organic insulating layer having a contact hole exposing an output of each of said thin film transistors and a projection;

(iii) a plurality of first electrodes formed on said organic insulating layer, each of said first electrodes having a portion that is connected with said output so as to receive a first electric power, and a rest portion that covers said projection; and (iv) a viewing-angle varying section disposed between said first electrodes, the viewing-angle varying section having a curved surface and protruding from the organic insulating layer, the viewing-angle varying section having a symmetrical shape and the rest portion disposed at both sides of the viewing-angle varying section asymmetrically extends onto the curved surface of the viewing-angle varying section;

a second substrate including i) a color filter disposed opposite to said first electrode and ii) a second electrode covering said color filter; and a liquid crystal interposed between said first substrate and said second substrate.

* * * * *